(12) United States Patent
Wu et al.

(10) Patent No.: US 10,028,177 B2
(45) Date of Patent: Jul. 17, 2018

(54) NETWORK HANDOVER METHOD, DEVICE, AND SYSTEM

(71) Applicant: Huawei Technologies Co., Ltd., Shenzhen, Guangdong (CN)

(72) Inventors: Xiaobo Wu, Shanghai (CN); Ye Zou, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 15/146,063

(22) Filed: May 4, 2016

(65) Prior Publication Data

US 2016/0249258 A1 Aug. 25, 2016

Related U.S. Application Data

(63) Continuation of application No. PCT/CN2013/086517, filed on Nov. 4, 2013.

(51) Int. Cl.
*H04W 4/00* (2018.01)
*H04W 36/00* (2009.01)
(Continued)

(52) U.S. Cl.
CPC ......... *H04W 36/0022* (2013.01); *H04M 1/57* (2013.01); *H04W 68/02* (2013.01); *H04W 76/10* (2018.02); *H04W 8/22* (2013.01)

(58) Field of Classification Search
CPC . H04W 36/0022; H04W 68/02; H04W 76/02; H04W 74/0816; H04W 72/0406; H04M 1/57; H04L 5/0055
(Continued)

(56) References Cited

U.S. PATENT DOCUMENTS

2011/0080867 A1* 4/2011 Mildh ................... H04W 76/10
370/328
2011/0103277 A1* 5/2011 Watfa ................ H04W 36/0022
370/310
(Continued)

FOREIGN PATENT DOCUMENTS

| CN | 101964965 A | 2/2011 |
| CN | 102045791 A | 5/2011 |
| CN | 103167564 A | 6/2013 |

OTHER PUBLICATIONS

3rd Generation Partnership Project;Technical Specification Group Services and System Aspects;Circuit Switched Fallback in Evolved Packet System; 3GPP TS 23.272 V9.1.0 (Sep. 2009).*
(Continued)

*Primary Examiner* — Faisal Choudhury

(57) ABSTRACT

The present invention discloses a network handover method, where in a process of implementing circuit switched fallback, handover from an LTE network to a 2G or 3G network is triggered, so that UE can be directly handed over from the LTE network to a CS domain of the 2G or 3G network, and the network or the UE uses a session generated in the process in which the called party is handed over from the LTE network to the CS domain of the 2G or 3G network. Therefore, a common called procedure does not need to be performed after the UE is handed over from the LTE network to the 2G or 3G network, thereby shortening time for which a user waits before the voice session is connected.

19 Claims, 7 Drawing Sheets

(51) Int. Cl.
  *H04M 1/57*    (2006.01)
  *H04W 68/02*   (2009.01)
  *H04W 76/10*   (2018.01)
  *H04W 8/22*    (2009.01)

(58) Field of Classification Search
  USPC .......................................................... 370/331
  See application file for complete search history.

(56)                References Cited

U.S. PATENT DOCUMENTS

| | | | |
|---|---|---|---|
| 2011/0274038 A1* | 11/2011 | Zhu .................. | H04W 36/0022 |
| | | | 370/328 |
| 2012/0122459 A1 | 5/2012 | Wu et al. | |
| 2013/0258888 A1* | 10/2013 | Jeong .................... | H04W 36/14 |
| | | | 370/252 |
| 2014/0177599 A1 | 6/2014 | Tao | |
| 2014/0204901 A1* | 7/2014 | Hedman ........... | H04W 36/0022 |
| | | | 370/331 |
| 2015/0257043 A1* | 9/2015 | Wallis ............... | H04W 36/0022 |
| | | | 455/436 |
| 2015/0295833 A1* | 10/2015 | Mizukoshi ............ | H04L 47/125 |
| | | | 370/235 |
| 2016/0249257 A1* | 8/2016 | Wu .................... | H04W 36/0022 |
| 2017/0332285 A9* | 11/2017 | Wallis ............... | H04W 36/0022 |

OTHER PUBLICATIONS

"3rd Generation Partnership Project; Technical Specification Group Services and System Aspects; Circuit Switched (CS) fallback in Evolved Packet System (EPS); Stage 2 (Release 12)", 3GPP TS 23.272 V12.0.0 Sep. 2013, 97 pages.

* cited by examiner

NETWORK HANDOVER METHOD, DEVICE, AND SYSTEM

CROSS-REFERENCE TO RELATED APPLICATIONS

This application is a continuation of International Patent Application No. PCT/CN2013/086517 filed on Nov. 4, 2013, which is hereby incorporated by reference in the entirety.

TECHNICAL FIELD

The present invention relates to the field of communications technologies, and specifically, to a network handover method, device, and system.

BACKGROUND

Full coverage of a second generation (2G) or third generation (3G) network such as Global System for Mobile Communications (GSM) or Wideband Code Division Multiple Access (WCDMA) has been basically implemented.

With development of Long Term Evolution (LTE) network technologies, LTE networks have covered some urban areas and traffic hot spot areas. In this way, on current communication networks, the LTE networks coexist with the 2G or 3G network.

During a call, user equipment (UE) may enter a 2G or 3G network from an LTE network, and handover from a packet switched (PS) domain to a circuit switched (CS) domain is required due to different bearer mechanisms of the LTE network and the 2G or 3G network, where interruption of a voice call may occur, and consequently, continuity of the voice call of a user is affected.

Circuit switched fallback (CSFB) is that when user equipment (UE) covered by LTE network processes a voice service, the UE first falls back to a network that has a CS domain, and processes the voice service on the network that has a CS domain, thereby fulfilling an objective of reusing an existing CS domain device to provide a traditional voice service for a user on the LTE network. In the prior art, in a process of implementing CSFB, handover of UE from an LTE network to a CS domain of a 2G or 3G network is triggered, which reduces an access delay of accessing the CS domain of the 2G or 3G network by the UE, thereby also improving user experience.

In the prior art, for a call in which UE is a called party by means of CSFB, the UE moves from an LTE network to a 2G or 3G network after receiving the call, and then generates a voice session according to a called procedure to perform talking. As a result, a user waits a long time for a voice session to be connected, thereby easily leading to on-hook of the user, and causing failure of the call.

SUMMARY

For the foregoing problems in the prior art, embodiments of the present invention provide a network handover method, where in a process of implementing called CSFB, a network or UE uses a session generated in a process in which a called party is handed over from an LTE network to a CS domain of a 2G or 3G network. Therefore, a common called procedure does not need to be performed after the UE is handed over from the LTE network to the 2G or 3G network, thereby shortening time for which a user waits before the voice session is connected.

A first aspect of the present invention provides a network handover method, including:

sending, by a mobile switching center MSC, a paging request to a mobility management entity MME for an incoming call of user equipment UE;

receiving, by the MSC, a service request message that is sent by the MME in response to the paging request;

receiving, by the MSC, a handover request message sent by the MME, where the handover request message is used to request the MSC to hand over the UE from the LTE network to a circuit switched CS domain of a second generation 2G or third generation 3G network for circuit switched fallback CSFB;

generating, by the MSC in the handover process, a session for the incoming call according to the handover request message;

learning, by the MSC according to a handover complete message received from a base station of the 2G or 3G network, that the UE generates the session for the incoming call; and determining, by the MSC, that the UE accepts the incoming call, and using, by the MSC for the incoming call, the session generated in the handover process.

With reference to the first aspect, in a first possible implementation manner, after the MSC receives the handover complete message sent by the base station, the MSC determines not to send a call setup message to the UE.

With reference to the first aspect, in a second possible implementation manner, the method further includes:

sending, by the MSC, an address complete message or an alerting message after the MSC receives the service request message sent by the MME.

With reference to the first aspect or the first or the second possible implementation manner of the first aspect, in a third possible implementation manner, the method further includes:

starting, by the MSC, a timer after sending the CSFB paging request; and the determining, by the MSC, that the UE accepts the incoming call includes:

determining, by the MSC according to the received service request message sent by the MME and when the timer expires, that the UE accepts the incoming call.

With reference to the first aspect or the first or the second possible implementation manner of the first aspect, in a fourth possible implementation manner, the method further includes:

starting, by the MSC, a timer after sending the circuit switched fallback CSFB paging request; and the determining, by the MSC, that the UE accepts the incoming call includes:

determining, by the MSC according to the received handover request message and when the timer expires, that the UE accepts the incoming call.

With reference to the first aspect or the first or the second possible implementation manner of the first aspect, in a fifth possible implementation manner, the service request message is further used to notify the MSC that the UE accepts the incoming call; and the determining, by the MSC, that the UE accepts the incoming call includes:

determining, by the MSC according to the service request message, that the UE accepts the incoming call.

With reference to the first aspect or the first or the second possible implementation manner of the first aspect, in a sixth possible implementation manner, the method further includes:

receiving, by the MSC, an indication message sent by the MME, where the indication message is used to notify the MSC that the UE accepts the incoming call; and the determining, by the MSC, that the UE accepts the incoming call includes:

determining, by the MSC according to the indication message, that the UE accepts the incoming call.

A second aspect of the present invention provides a network handover method, including:

receiving, by user equipment UE located in a Long Term Evolution LTE network, a circuit switched fallback CSFB paging request that is sent by a mobility management entity MME for an incoming call;

receiving, in the LTE network by the UE, the incoming call;

sending, by the UE, a request message to the MME, where the request message is used to request circuit switched fallback CSFB;

receiving, by the called UE, a handover command sent by an evolved NodeB, where the handover command is used to instruct to hand over the UE from the LTE network to a circuit switched CS domain of a 2G or 3G network for the CSFB; and handing over the UE from the LTE network to the CS domain of the 2G or 3G network according to the handover command, and generating, in the handover process, a voice session for the UE according to the handover command; and performing, by the UE, talking by using the voice session generated in the handover process.

With reference to the second aspect, in a first possible implementation manner, the method further includes:

carrying, by the paging request, a user number of calling user equipment UE; and displaying, by the UE, the user number.

With reference to the second aspect or the first possible implementation manner of the second aspect, in a second possible implementation manner, the request message is further used to notify the MME that the called UE accepts the incoming call.

With reference to the second aspect or the first or the second possible implementation manner of the second aspect, in a third possible implementation manner, the method further includes:

determining, by the UE, that the UE supports the handover from the LTE network to the CS domain of the 2G or 3G network.

A third aspect of the present invention provides a network handover method, including:

receiving, by a mobility management entity MME from a mobile switching center MSC, a paging request for an incoming call;

sending, by the MME according to the paging request, a circuit switched fallback CSFB paging request to user equipment UE located in a Long Term Evolution LTE network;

receiving, by the MME, a request message initiated by the UE, where the request message is used to request CSFB; and notifying, by the MME according to the request message, the MSC that the UE accepts the incoming call; and sending, by the MME, a handover request message to the mobile switching center MSC, where the handover request message is used to request the MSC to hand over the UE from the LTE network to a CS domain of the 2G or 3G network for the CSFB.

With reference to the third aspect, in a first possible implementation manner, the method further includes:

starting, by the MME, a timer after sending the circuit switched fallback CSFB paging request; and the notifying, by the MME, the MSC that the UE accepts the incoming call includes:

notifying, by the MME according to the received request message and when the timer expires, the MSC that the UE accepts the incoming call.

With reference to the third aspect or the first possible implementation manner of the third aspect, in a second possible implementation manner, the request message is further used to notify the MME that the UE accepts the incoming call.

With reference to the third aspect, in a third possible implementation manner, the notifying, by the MME, the MSC that the UE accepts the incoming call includes:

notifying, by the MME by sending a service request message to the MSC, the MSC that the UE accepts the incoming call.

With reference to the third aspect and any one of the first to the third possible implementation manners of the third aspect, in a fourth possible implementation manner, the CSFB paging request is further used to notify the UE of the incoming call.

With reference to the third aspect and any one of the first to the fourth possible implementation manners of the third aspect, in a fifth possible implementation manner, the method further includes:

determining, by the MME, that the UE supports the handover from the LTE network to the CS domain of the 2G or 3G network.

A fourth aspect of the present invention provides a mobile switching center MSC, including:

a sending unit, configured to send a paging request to a mobility management entity MME for an incoming call of user equipment UE;

a receiving unit, configured to receive a service request message that is sent by the MME in response to the paging request; where the receiving unit is further configured to receive a handover request message sent by the MME, where the handover request message is used to request the MSC to hand over the UE from the LTE network to a circuit switched CS domain of a second generation 2G or third generation 3G network for circuit switched fallback CSFB;

a generation unit, configured to generate, in the handover process, a session for the incoming call according to the handover request message received by the receiving unit; where the receiving unit is further configured to receive a handover complete message from a base station of the 2G or 3G network;

a learning unit, configured to learn, according to the handover complete message received by the receiving unit from the base station of the 2G or 3G network, that the UE generates the session for the incoming call; and a determining unit, configured to: after the learning unit learns that the UE generates the session for the incoming call, determine that the UE accepts the incoming call; and use, for the incoming call, the session generated in the handover process.

With reference to the fourth aspect, in a first possible implementation manner, after the receiving unit receives the handover complete message sent by the base station, the sending unit does not send a call setup message to the called UE.

With reference to the fourth aspect, in a second possible implementation manner, the receiving unit is configured to receive the service request message sent by the MME; and the sending unit is configured to send an address complete message or an alerting message after the receiving unit receives the service request message.

With reference to fourth aspect or the first or the second possible implementation manner of the fourth aspect, in a third possible implementation manner, the MSC further includes:

a first control unit, configured to start a timer after the sending unit sends the circuit switched fallback CSFB paging request; and the determining unit is configured to: after the receiving unit receives the service request message sent by the MME and when the timer started by the first control unit expires, determine that the UE accepts the incoming call.

With reference to fourth aspect or the first or the second possible implementation manner of the fourth aspect, in a fourth possible implementation manner, the MSC further includes:

a second control unit, configured to start a timer after the MSC sends the circuit switched fallback CSFB paging request; and the determining unit is configured to: after the receiving unit receives the handover request message and when the timer started by the second control unit expires, determine that the UE accepts the incoming call.

With reference to fourth aspect or the first or the second possible implementation manner of the fourth aspect, in a fifth possible implementation manner, the service request message is further used to notify the MSC that the UE accepts the incoming call; and the determining unit is configured to determine, according to the service request message, that the UE accepts the incoming call.

With reference to fourth aspect or the first or the second possible implementation manner of the fourth aspect, in a sixth possible implementation manner, the receiving unit is further configured to receive an indication message sent by the MME, where the indication message is used to notify the MSC that the UE accepts the incoming call; and the determining unit is configured to determine, according to the indication message, that the UE accepts the incoming call.

A fifth aspect of the present invention provides user equipment UE, including:

a receiving unit, configured to receive a circuit switched fallback CSFB paging request that is sent by a mobility management entity MME for an incoming call;

an accepting unit, configured to accept, in the LTE network, the incoming call according to the CSFB paging request received by the receiving unit;

a generation unit, configured to generate a request message after the receiving unit receives the CSFB paging request, where the request message is used to request CSFB;

a sending unit, configured to send, to the MME, the request message generated by the generation unit; where the receiving unit is further configured to receive a handover command sent by an evolved NodeB, where the handover command is used to instruct to hand over the UE from the LTE network to a circuit switched CS domain of a 2G or 3G network for the CSFB;

a handover unit, configured to hand over the UE from the LTE network to the CS domain of the 2G or 3G network according to the handover command received by the receiving unit; where the generation unit is further configured to generate, in the handover process of the handover unit, a voice session for the UE; and a talking unit, configured to perform talking by using the voice session generated by the generation unit.

With reference to the fifth aspect, in a first possible implementation manner, the paging request carries a user number of calling user equipment UE; and the UE further includes:

a display unit, configured to display the user number of the calling UE.

With reference to the fifth aspect or the first possible implementation manner of the fifth aspect, in a second possible implementation manner, the request message is further used to notify the MME that the called UE accepts the incoming call.

With reference to the fifth aspect or the first possible implementation manner of the fifth aspect, in a third possible implementation manner, the UE further includes:

a determining unit, configured to determine that the UE supports the handover from the LTE network to the CS domain of the 2G or 3G network.

A sixth aspect of the present invention provides a mobility management entity MME, including:

a receiving unit, configured to receive, from a mobile switching center MSC, a paging request for an incoming call;

a generation unit, configured to generate a circuit switched fallback CSFB paging request according to the paging request received by the receiving unit;

a sending unit, configured to send the circuit switched fallback CSFB paging request to user equipment UE located in a Long Term Evolution LTE network; where the receiving unit is further configured to receive a request message initiated by the UE, where the request message is used to request CSFB; and a notification unit, configured to: after the receiving unit receives the request message, notify the MSC that the UE accepts the incoming call; where the generation unit is further configured to generate a handover request message after the notification unit notifies the MSC that the UE accepts the incoming call, where the handover request message is used to request the MSC to hand over the UE from the LTE network to a CS domain of the 2G or 3G network for the CSFB; and the sending unit is further configured to send, to the mobile switching center MSC, the handover request message generated by the generation unit.

With reference to the sixth aspect, in a first possible implementation manner, the mobility management entity further includes:

a control unit, configured to start a timer after the sending unit sends the circuit switched fallback CSFB paging request; where the notification unit is configured to notify, according to the request message received by the receiving unit and when the timer started by the control unit expires, the MSC that the UE accepts the incoming call.

With reference to the sixth aspect or the first possible implementation manner of the sixth aspect, in a second possible implementation manner, the request message is further used to notify the MME that the UE accepts the incoming call.

With reference to the sixth aspect, in a third possible implementation manner, the notification unit is configured to notify, by sending a service request message to the MSC, the MSC that the UE accepts the incoming call.

With reference to the sixth aspect and any one of the first to the third possible implementation manners of the sixth aspect, in a fourth possible implementation manner, the CSFB paging request is further used to notify the UE of the incoming call.

With reference to the sixth aspect and any one of the first to the fourth possible implementation manners of the sixth aspect, in a fifth possible implementation manner, the mobility management entity further includes:

a determining unit, configured to determine that the UE supports the handover from the LTE network to the CS domain of the 2G or 3G network.

A seventh aspect of the present invention provides a network handover system, including: a mobility management entity, an evolved NodeB, a mobile switching center, a base station, and user equipment, where the mobile switching center is the mobile switching center in the foregoing technical solutions;

the user equipment is the user equipment in the foregoing technical solutions; and the mobility management entity is the mobility management entity in the foregoing technical solutions.

By using the embodiments provided in the present invention, in a process of implementing circuit switched fallback, handover from an LTE network to a 2G or 3G network is triggered, so that UE can be directly handed over from the LTE network to a CS domain of the 2G or 3G network. In addition, in a process of implementing called CSFB, a CS paging message in a CSFB called process carries a user number and the UE immediately enters an alerting state; the UE is allowed to display the user number to a user before the UE falls back to the 2G or 3G network, and the user is allowed to choose whether to answer the session (for example, a voice session). If the user decides to answer the voice session, the UE sends an extended service request message to an MME to notify the MME that the user decides to answer the voice session, and to instruct an eNodeB to trigger a CSFB process, so that the eNodeB triggers handover of the UE from the LTE network to the CS domain of the 2G or 3G network, thereby avoiding that the UE can enter an alerting state only after the UE returns to a GSM network.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION

Embodiments of the present invention provide a network handover method, where in a process of implementing circuit switched fallback, handover of UE from an LTE network to a CS domain of a 2G or 3G network is triggered, so that an access delay of accessing the CS domain of the 2G or 3G network by the UE is reduced, and user experience is also improved. The embodiments of the present invention further provide a corresponding device and system. Details are separately illustrated in the following.

English expressions and abbreviations of some communication terms involved in the embodiments of the present invention include: mobility management entity (MME), evolved NodeB (eNodeB), user equipment (UE), mobile switching center (MSC), second generation or third generation mobile communications technology (2G or 3G), base station (BS), Long Term Evolution (LTE), serving GPRS support node (SGSN), circuit switched fallback (CSFB), universal terrestrial radio access network (UTRAN), Global System for Mobile Communications (GSM) network, Enhanced Data rates for GSM Evolution (EDGE), and Global System for Mobile Communications/Enhanced Data rates for GSM Evolution radio access network (GERAN), where a base station in the embodiments of the present invention includes a base station controller (BSC) and a radio network controller (RNC).

In the embodiments of the present invention, "first", "second", "third", "fourth", "fifth", and the like are only used for distinguishing different indication information, messages, or other objects, rather than representing a sequence relationship.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Figure 1:
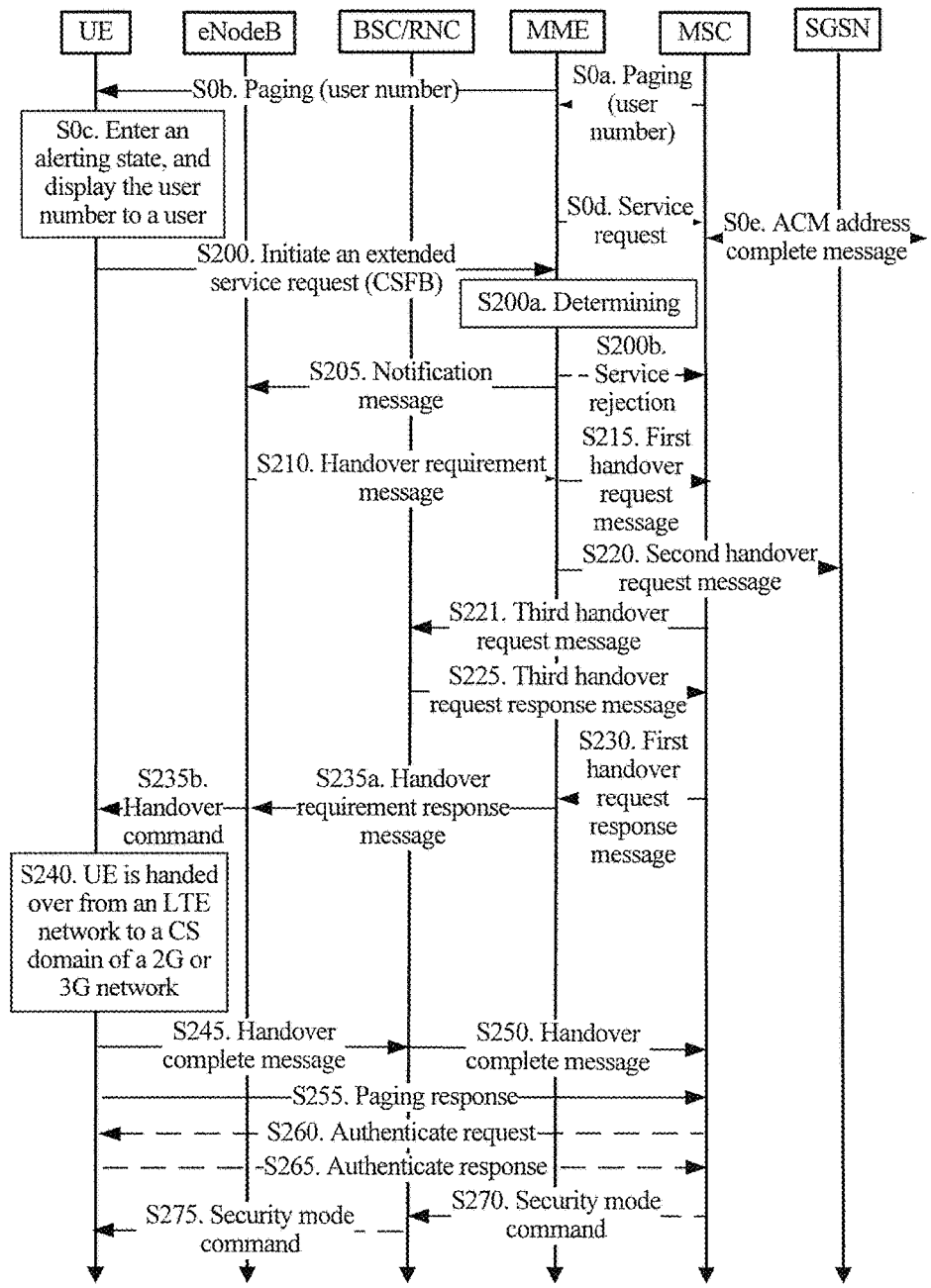
FIG. 1 is a schematic diagram of an embodiment of a network handover method according to an embodiment of the present invention.

Referring to FIG. 1, FIG. 1 is a network handover process and a passive call process after network handover in an embodiment of the present invention.

S0a. An MSC sends a paging request to an MME, where the paging request carries a user number.

S0b. The MME triggers a paging process, and sends a CSFB paging request to UE, where the CSFB paging request carries the user number.

The CSFB paging request instructs the UE to notify a user of an incoming call.

Specifically, the CSFB paging request sent by the MME is a circuit switched fallback notification message (CSFB Notification), where the MME can send the CSFB Notification message to the UE only when the UE is in a connected state.

Further, if the UE is in an idle state, the MME first triggers an E-mail scheduling system (EPS) to perform paging, and changes the UE from the idle state into the connected state. Then, the MME can send the CSFB Notification message to the UE.

Optionally, if the MME determines, according to a capability of the called UE, that the called UE supports handover from the LTE network to a CS domain of the 2G or 3G network, the MME sends, to the called UE, the CSFB paging request that carries the number of the calling user equipment.

S0c. After receiving a paging message, the UE enters an alerting state.

Further, the UE displays the user number to the user.

Optionally, only when the UE determines that the UE supports the handover from the LTE network to the CS domain of the 2G or 3G network for the CSFB, the UE enters the alerting state, and may display the user number to the user.

S0d. The MME sends a service request message to the MSC.

Optionally, after the MME receives a request message initiated by the UE, the MME sends the service request message to the MSC, so as to notify the MSC that the UE accepts the incoming call.

S0e. The MSC sends an ACM (address complete message) or Alerting message to instruct a calling user to enter the alerting state.

S200. The UE accepts the incoming call, and the UE sends a request message to the MME, where the request message is used to request circuit switched fallback CSFB.

The request message may be an extended service request message.

If the UE notifies, in the extended service request, the MME that the user rejects a current service, the MME executes step S200b, that is, sends a service rejection message to notify the MSC that the user rejects the current service.

If the UE notifies, in the extended service request, the MME that the user accepts a current service, the MME sends a message in S205 to an eNodeB, and executes a subsequent circuit switched fallback process. In this case, the UE enters a talk state, that is, enters a connected state.

S200a. The MME may determine whether an LTE network and a 2/3G network support handover of the UE from the LTE network to a CS domain of the 2G or 3G network for the CSFB.

The MME may not perform the determining, but considers by default that communications networks support the handover of the UE from the LTE network to the CS domain of the 2G or 3G network for the CSFB, or the MME performs the determining on only some networks of the communication networks.

The communications networks are the LTE network and the 2G or 3G network.

S200b. The MME sends a service rejection message to the MSC.

S205. The MME sends a notification message to an evolved NodeB according to the extended service request, where the notification message is used to instruct the eNodeB to move the UE from the LTE network to the CS domain of the 2G or 3G network for the CSFB, that is, the notification message is used to notify the eNodeB that the UE should be moved to the 2G or 3G network for the CSFB.

When the MME determines that the LTE network and the 2G or 3G network support the handover of the UE from the LTE network to the CS domain of the 2G or 3G network for the CSFB, the MME may inform, by sending the notification message, the eNodeB that the LTE network and the 2G or 3G network support the handover of the UE from the LTE network to the CS domain of the 2G or 3G network for the CSFB, so that the eNodeB initiates a handover requirement of handing over the UE from the LTE network to the CS domain of the 2G or 3G network for the CSFB.

For example, the notification message may include indication information, and the indication information is used to indicate that the communications networks and the UE support the handover of the UE from the LTE network to the CS domain of the 2G or 3G network for the CSFB.

For example, the indication information may be indication information of single radio voice call continuity (SRVCC) handover, and is used to indicate that the LTE network and the 2G or 3G network support the handover of the UE from the LTE network to the 2G or 3G network for the CSFB.

The indication information in this embodiment of the present invention may be referred to as an optimized CSFB indicator, a single radio voice call continuity (SRVCC) based CSFB indicator, an enhanced CSFB indicator, an enhanced CSFB possibility indicator, or an SRVCC operation possibility indicator.

S210. The eNodeB sends a handover requirement message to the MME.

The eNodeB sends the handover requirement message to the MME according to a handover capability that the UE supports the handover from the LTE network to the CS domain of the 2G or 3G network. Specifically, the eNodeB determines, according to an FGI (feature group indicator) reported by the UE, whether the UE supports the handover capability of the handover from the LTE network to the CS domain of the 2G or 3G network.

Further, even though the eNodeB has no bearer whose QCI=1 (quality of service class identifier), the eNodeB sends the handover requirement message to the MME. however in the prior art, only when the UE has the handover capability of the handover from the LTE network to the CS domain of the 2G or 3G network, and the eNodeB has the bearer whose QC=1, the eNodeB sends the handover requirement message to the MME.

The handover requirement message may be a handover requirement message of handover from the LTE network to a packet switched PS domain of the 2G or 3G network (for example, an LTE to 2/3G PS HO Required message), or a handover requirement message of handover from the LTE network to the CS domain of the 2G or 3G network (for example, an LTE to 2/3G SRVCC HO Required message), or a handover requirement message of handover from the LTE network to the PS domain and the CS domain that are of the 2G or 3G network (for example, an LTE to 2/3G SRVCC and PS HO Required message).

The handover requirement message may include UE capability information, which is used to indicate information about a frequency range supported by the UE, an access capability, and the like. For example, the UE capability information may be at least one of a classmark 2 and a classmark 3. In the prior art, when the UE does not support the handover from the LTE network to the CS domain of the 2G or 3G network, the eNodeB does not send the UE capability information to the MME, and therefore, the MME does not have the UE capability information. However, after the MME acquires the UE capability information, the MME may send the UE capability information to the MSC, so that the MSC can perform the handover to the CS domain of the 2G or 3G network. In this embodiment of the present invention, the UE capability information may be transferred to the MME by using a handover request message.

The handover requirement message includes first indication information, where the first indication information is used to request the MME to hand over the UE from the LTE network to the CS domain of the 2G or 3G network for the CSFB, or the first indication information is used to request the MME to hand over the UE from the LTE network to the CS domain of the 2G or 3G network for the CSFB, and is used to indicate that the UE supports the handover from the LTE network to the CS domain of the 2G or 3G network.

Alternatively, the handover requirement message includes a source-to-target transparent container. The source-to-target transparent container includes second indication information, where the second indication information is used to request a base station of the 2G or 3G network to hand over the UE from the LTE network to the CS domain of the 2G or 3G network for the CSFB; and/or the source-to-target transparent container includes LTE PLMN information, where the LTE PLMN information is used to notify the base station of the 2G or 3G network of PLMN information of the LTE network on which the UE camps.

For example, during the handover from the LTE network to the CS domain of the 2G or 3G network, the eNodeB sets, as the PLMN information of the LTE network on which the UE currently camps, PLMN information in last visited cell information in UE history information protected by the source-to-target container. The first indication information may be referred to as a CSFB indicator, an optimized CSFB indicator, an SRVCC based CSFB indicator, an enhanced CSFB indicator, or an enhanced CSFB possibility indicator.

When the second indication information does not indicate that the UE supports the handover from the LTE network to the CS domain of the 2G or 3G network, the MME may consider by default that the UE supports the handover. When the first indication information does not indicate that the UE supports the handover from the LTE network to the CS domain of the 2G or 3G network, the base station of the 2/3G network may consider by default that the UE supports the handover. The second indication information and the first indication information may be referred to as a CSFB indicator, an optimized CSFB indicator, an SRVCC based CSFB indicator, an enhanced CSFB indicator, or an enhanced CSFB possibility indicator.

For example, the second indication information may include a CSFB indicator field, or may include a CSFB indicator field and a UE capability field. The CSFB indicator field instructs the MME to hand over the UE from the LTE network to the circuit switched CS domain of the 2G or 3G network for the CSFB. The UE capability field indicates that the UE supports the handover from the LTE network to the PS domain of the 2G or 3G network.

The first indication information may include a CSFB indicator field, or may include a CSFB indicator field and a UE capability field. The CSFB indicator field instructs the base station of the 2/3G network to hand over the UE from the LTE network to the circuit switched CS domain of the 2G or 3G network for the CSFB. The UE capability field indicates that the UE supports the handover from the LTE network to the PS domain of the 2G or 3G network.

For example, (a) if a target network is a UTRAN network, the eNodeB includes the second indication information to a source RNC to target RNC transparent container, where a CSFB information field in an existing source RNC to target RNC transparent container may be used as the CSFB indicator field, and a field may be added to the source RNC to target RNC transparent container and used as the UE capability field;

(b) if a target network is a GERAN network, the eNodeB adds the second indication information to old BSS to new BSS information, where the CSFB indicator field or the UE capability field may be added to the old BSS to new BSS information.

S215. The MME sends a first handover request message to the MSC, where the first handover request message is used to request the MSC to hand over the UE from the LTE network to the circuit switched CS domain of the second generation 2G or third generation 3G network for the CSFB.

The MSC generates a session for the incoming call according to the first handover request message.

The MME determines that the UE accepts the incoming call, and the MME notifies the MSC that the UE accepts the incoming call. Specifically, the MME may determine, by using the following method, that the UE accepts the incoming call:

starting, by the MME, a timer after sending the circuit switched fallback CSFB paging request; and determining, by the MME according to the received request message and when the timer expires, that the UE accepts the incoming call.

Specifically, after the MME sends a message in S0b, the MME starts the timer. When the MME receives the request message that is in step S200, if the timer expires, the MME determines that the UE accepts the incoming call.

Optionally, the first handover request message sent by the MME carries indication information, where the indication information is used to notify the MSC that the UE accepts the incoming call, and may be further used to instruct the MSC to perform talking by using a voice session that is generated for the called UE and that is generated in a process of the handover from the LTE network to the CS domain of the 2G or 3G network. In this case, the MSC does not need to send a call setup message to the called UE.

Even though the MME has no bearer whose QCI=1, the MME still sends the first handover request message to the MSC. However in the prior art, only when the MME has the bearer whose QCI=1, the MME can send a handover request message to the MSC, and deletes at the same time the bearer whose QCI=1. Further, because there is no bearer whose QCI=1, the MME does not need to delete the bearer whose QCI=1.

Optionally, the first handover request message carries LTE PLMN information, where the LTE PLMN information is PLMN information of the LTE network on which the UE currently camps.

Because the first handover request message is sent by the MME to the MSC, handover requirement by the first handover request message is the handover from the LTE network to the CS domain of the 2G or 3G network, that is, the first handover request is a PS-to-CS handover request.

The first handover request message may carry third indication information, where the third indication information is used to request the MSC to hand over the UE from the LTE network to the CS domain of the 2G or 3G network for the CSFB, that is, the third indication information is used to indicate that the first handover request is sent for the CSFB.

The third indication information may further indicate that the UE supports the handover from the LTE network to the CS domain of the 2G or 3G network. The first handover request message may not indicate the CSFB either, and in this case, the MSC considers by default that the first handover request is sent for the CSFB.

After the MME receives the UE capability information from the eNodeB, the first handover request message may carry the UE capability information; for example, the UE capability information may be at least one of a classmark 2 and a classmark 3.

Because the UE does not support the handover from the LTE network to the CS domain of the 2G or 3G network, the UE does not report voice coding/decoding information supported by the UE; in this case, the MME may add default voice coding/decoding information to the first handover request message according to a target system of handover.

The third indication information in the first handover request message may be referred to as a CSFB indicator, an optimized CSFB indicator, a single radio voice call continuity (SRVCC) based CSFB indicator, an enhanced CSFB indicator, or an enhanced CSFB possibility indicator.

When the first handover request message carries a session transfer number-single radio STN-SR), the MSC ignores the STN-SM-SR.

S220. The MME sends a second handover request message to an SGSN, where the second handover request message is used to request the SGSN to initiate handover from the LTE network to a packet switched PS domain of the 2G or 3G network.

During handover from the LTE network to the CS domain, the UE may be handed over to the PS domain at the same time, or may not be handed over to the PS domain at the same time, which can reduce network dependency of this solution; that is, it is only required that an operator supports the handover from LTE network to the CS domain of the 2G or 3G network, and it is unnecessary to force the operator to support the handover from LTE to the PS domain of the 2G or 3G network.

S221. The MSC sends a third handover request message to a base station, where the third handover request message is used to request the base station to allocate a CS domain resource for the handover of the UE to the CS domain of the 2G or 3G network.

Because the first handover request message may carry the third indication information, the MSC does not initiate a Session Transfer process to an IMS (IP multimedia subsystem). Specifically, the MSC does not send an Invite message to the IMS.

The third handover request message is further used to request the base station to hand over the user equipment UE from the Long Term Evolution LTE network to the circuit switched CS domain of the 2G or 3G network for the CSFB. The base station allocates the CS domain resource for the handover of the UE from the LTE network to the CS domain of the 2G or 3G network.

The third handover request message carries LTE PLMN information, where the LTE PLMN information is used to notify the base station of the 2G or 3G network of PLMN information of the LTE network on which the UE camps. Specifically, during the handover from the LTE network to the CS domain of the 2G or 3G network, the MSC adds an SAI (Serving Area Identification) to the third handover request message, where PLMN information included in the SAI is the PLMN information of the LTE network on which the UE currently camps, so as to notify the base station of the 2G or 3G network of the PLMN information of the LTE network on which the UE camps, where SAI=PLMN-Id||LAC||SAC.

The MSC acquires the LTE PLMN information in a process in which the UE performs combined registration, or acquires the LTE PLMN information from the first handover request message sent by the MME.

For example, the CS domain resource allocated by the base station includes a wired resource between the base station and the MSC and a radio resource between the base station and the UE.

For example, the third handover request message includes fifth indication information, where the fifth indication information is used to request the base station to hand over the UE from the LTE network to the CS domain for the CSFB; and/or the fifth indication information is used to indicate that the UE supports the handover from the LTE network to the CS domain of the 2G or 3G network.

The third handover request message includes a source-to-target transparent container, where the source-to-target transparent container includes the fifth indication information.

When the first handover request message does not include voice coding/decoding information supported by the UE, the MSC sets default coding/decoding information according to a type of the 2G or 3G network.

The default coding/decoding information may be included in the third handover request message.

The third handover request message includes integrity protection information and/or encryption information, so that after receiving a handover complete message, the base station sends a security mode command to the UE.

S225. The base station sends a third handover request response message to the MSC, where the third handover request response message includes information about the CS domain radio resource, and the information about the CS domain radio resource is used for the handover of the UE from the LTE network to the CS domain of the 2G or 3G network.

S230. The MSC sends a first handover response message to the MME, where the first handover response message includes the information about the CS domain radio resource.

S235a. The MME sends a handover requirement response message to the eNodeB, where the handover requirement response message includes the information about the CS domain radio resource.

S235b. The eNodeB sends a handover command to the UE, where the handover command includes information about the CS domain radio resource.

For example, the handover command includes fourth indication information, where the fourth indication information is used to instruct to hand over the UE from the LTE network to the CS domain of the 2G or 3G network for the CSFB.

For example, the handover command further includes information about a PS domain resource, and the UE is handed over from the LTE network to the PS domain of the 2G or 3G network according to the information about the PS domain resource.

The handover command may be further used to instruct to hand over the UE from the LTE network to the PS domain of the 2G or 3G network.

S240. Hand over the UE from the LTE network to the CS domain of the 2G or 3G network according to the handover command.

The UE is handed over from the LTE network to the CS domain of the 2G or 3G network for the CSFB by using resource information included in the handover command. The UE is handed over from the LTE network to the CS domain of the 2G or 3G network according to the handover command, and a voice session is generated for the UE in the handover process according to the handover command.

In this case, the UE may receive or send voice data, and enters a voice talk state by using the session.

When the resource information includes a CS encryption algorithm identifier, the UE activates, in the process of the handover from the LTE network to the 2G network or the 3G network, CS domain encryption according to the CS encryption algorithm identifier.

S245. After completing the handover, the UE sends a handover complete (HO Complete) message to the base station (a BSC or an RNC).

S250. The base station forwards the handover complete message in step S245 to the MSC.

The MME determines that the UE accepts the incoming call, and therefore, the MSC does not need to send the call setup message (Setup) to the called UE.

S255. The UE sends a paging response to the MSC, and the MSC ignores the paging response. Because the MME determines that the UE accepts the incoming call, the MME does not need to send the call setup message (Setup) to the called UE.

S260. The MSC sends an authenticate request to the UE.

The step S260 may not be executed, that is, the MSC does not send an authenticate request message to the UE.

S265. The UE sends an authenticate response to the MSC.

S270. The MSC sends a security mode command to the base station, where the security mode command carries integrity protection information and/or encryption information, so that the base station sends the security mode command to the UE.

The step S270 may not be executed, that is, the MSC does not send the security mode command to the UE.

S275. The base station sends the security mode command to the UE. Specifically, the base station executes this step according to the security mode command in step S270, or the base station executes this step after receiving the message in S245.

When a call ends, because the call is triggered by means of the CSFB, the UE needs to return to the LTE network after completing the call. The base station determines, according to the third handover request message, that the call is triggered by the CSFB. Therefore, after the base station of the 2/3G network receives a call release message sent by the MSC, the base station of the 2/3G network redirects the UE to the LTE network, or the base station hands over the UE to the LTE network, where the call release message is a Iu Release Command or a clear command.

It should be noted that, in this embodiment, the base station may parse CS signaling that is between the UE and the MSC. The base station receives a signaling message sent by the UE to the MSC, for example, a call acknowledgement message, the authenticate response, or a second CS call connection setup request message. The base station may send the signaling message to the MSC by using a connection that is set up in the process of the handover from the LTE network to the CS domain of the 2G or 3G network, or may send the signaling message to the MSC in a manner of directly sending the message.

In this embodiment, the indication information included in the notification message, the second indication information, the third indication information, the fourth indication information, and the fifth indication information that are included in the handover requirement message may include a CSFB indicator field, or may include a CSFB field and a UE capability field. The CSFB indicator field instructs the MME to hand over the UE from the LTE network to the circuit switched CS domain of the 2G or 3G network for the CSFB. The UE capability field indicates that the UE supports the handover from the LTE network to the PS domain of the 2G or 3G network.

By using the embodiment provided in the present invention, in a process of implementing circuit switched fallback, handover from an LTE network to a 2G or 3G network is triggered, so that UE can be directly handed over from the LTE network to a CS domain of the 2G or 3G network, and the network or the UE uses a session generated in the process in which the called party is handed over from the LTE network to the CS domain of the 2G or 3G network. Therefore, a common called procedure does not need to be performed after the UE is handed over from the LTE network to the 2G or 3G network, thereby shortening time for which a user waits before the voice session is connected.

Figure 2:
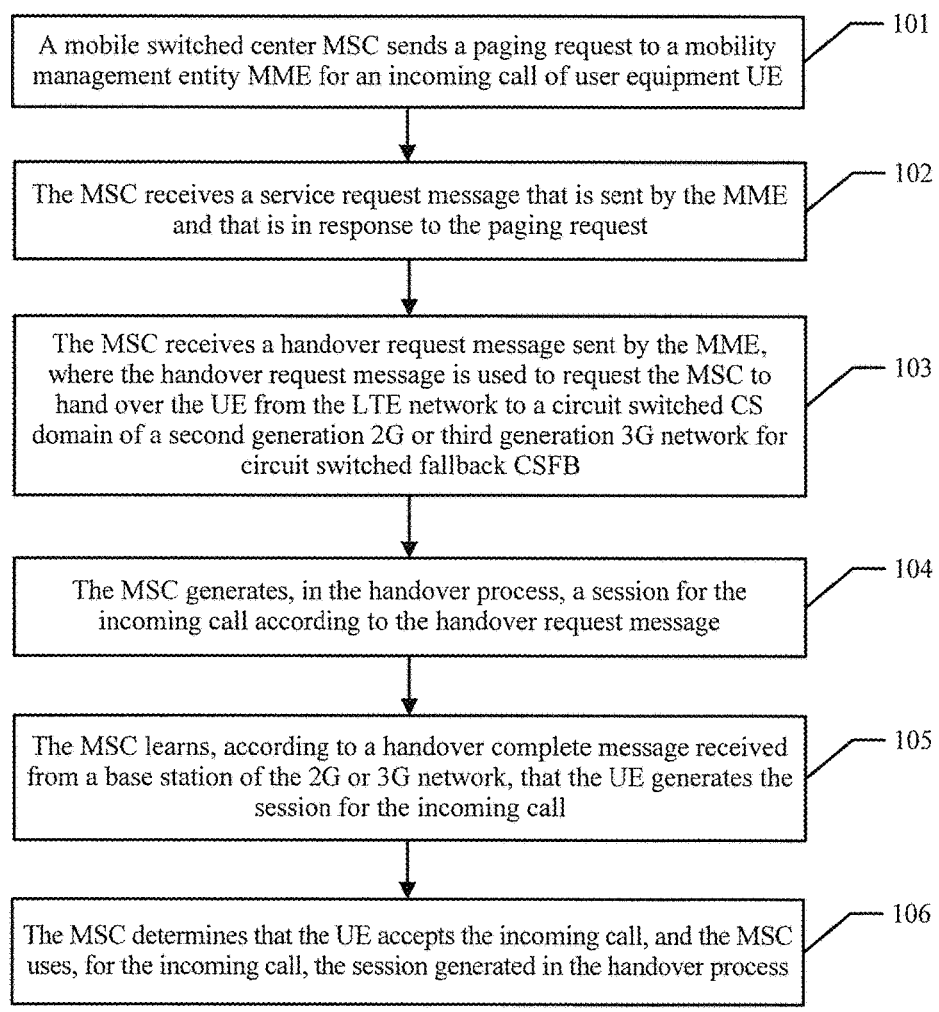
FIG. 2 is a schematic diagram of another embodiment of a network handover method according to an embodiment of the present invention.

Referring to FIG. 2, an embodiment of a network handover method provided in this embodiment of the present invention includes:

101. A mobile switching center MSC sends a paging request to a mobility management entity MME for an incoming call of user equipment UE.

102. The MSC receives a service request message that is sent by the MME in response to the paging request.

103. The MSC receives a handover request message sent by the MME, where the handover request message is used to request the MSC to hand over the UE from the LTE network to a circuit switched CS domain of a second generation 2G or third generation 3G network for circuit switched fallback CSFB.

104. The MSC generates, in the handover process, a session for the incoming call according to the handover request message.

105. The MSC learns, according to a handover complete message received from a base station of the 2G or 3G network, that the UE generates the session for the incoming call.

106. The MSC determines that the UE accepts the incoming call, and the MSC uses, for the incoming call, the session generated in the handover process.

For detailed descriptions of the foregoing processing steps and another processing step that are of the MSC in this embodiment, reference may be made to descriptions in the embodiment corresponding to FIG. 1, and details are not described herein again.

Figure 3:
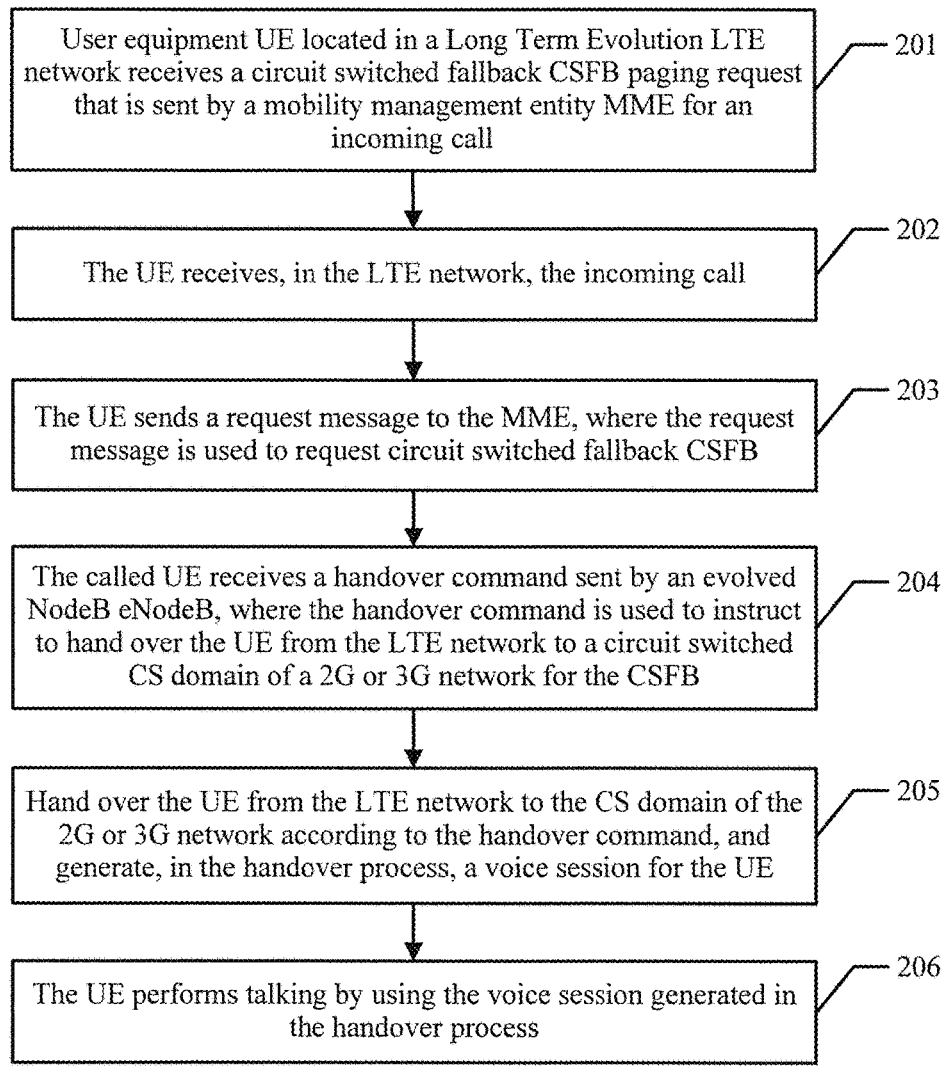
FIG. 3 is a schematic diagram of another embodiment of a network handover method according to an embodiment of the present invention.

Referring to FIG. 3, another embodiment of a network handover method provided in this embodiment of the present invention includes:

201. User equipment UE located in a Long Term Evolution LTE network receives a circuit switched fallback CSFB paging request that is sent by a mobility management entity MME for an incoming call.

202. The UE receives, in the LTE network, the incoming call.

203. The UE sends a request message to the MME, where the request message is used to request circuit switched fallback CSFB.

204. The called UE receives a handover command sent by an evolved NodeB, where the handover command is used to instruct to hand over the UE from the LTE network to a circuit switched CS domain of a 2G or 3G network for the CSFB.

205. Hand over the UE from the LTE network to the CS domain of the 2G or 3G network according to the handover command, and generate, in the handover process, a voice session for the UE according to the handover command.

206. The UE performs talking by using the voice session generated in the handover process.

For detailed descriptions of the foregoing processing steps and another processing step that are of the UE in this embodiment, reference may be made to descriptions in the embodiment corresponding to FIG. 1, and details are not described herein again.

Figure 4:
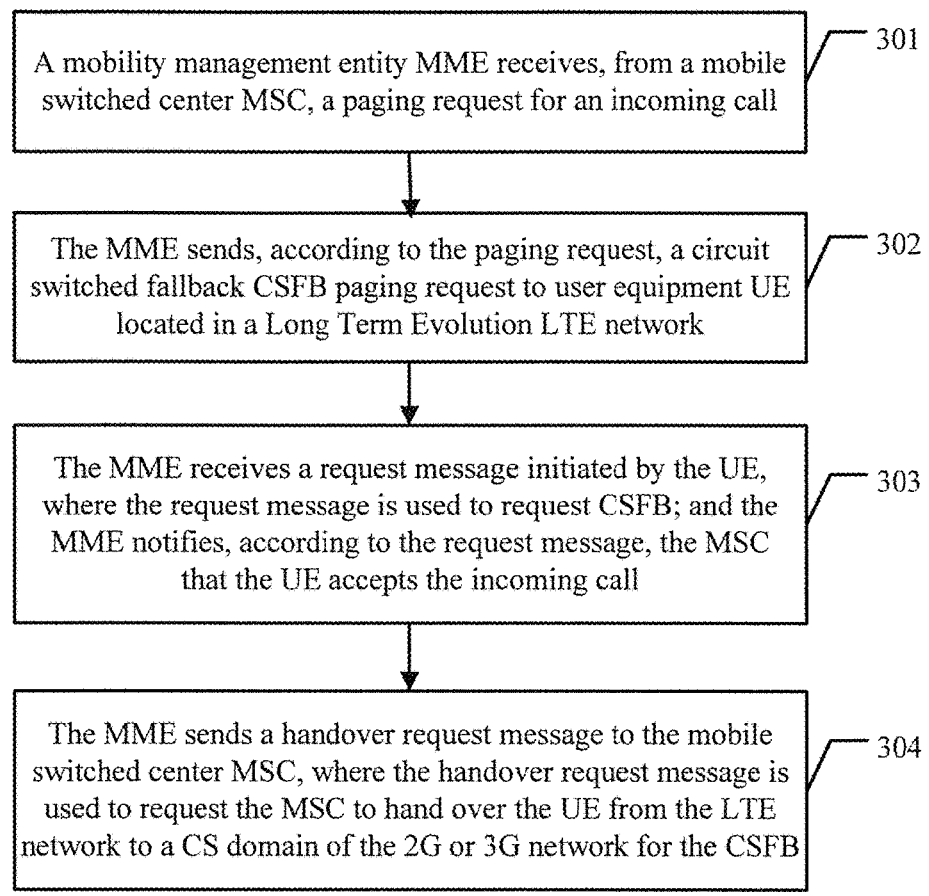
FIG. 4 is a schematic diagram of another embodiment of a network handover method according to an embodiment of the present invention.

Referring to FIG. 4, another embodiment of a network handover method provided in this embodiment of the present invention includes:

301. A mobility management entity MME receives, from a mobile switching center MSC, a paging request for an incoming call.

302. The MME sends, according to the paging request, a circuit switched fallback CSFB paging request to user equipment UE located in a Long Term Evolution LTE network.

303. The MME receives a request message initiated by the UE, where the request message is used to request CSFB; and the MME notifies, according to the request message, the MSC that the UE accepts the incoming call.

304. The MME sends a handover request message to the mobile switching center MSC, where the handover request message is used to request the MSC to hand over the UE from the LTE network to a CS domain of the 2G or 3G network for the CSFB.

For detailed descriptions of the foregoing processing steps and another processing step that are of the MME in this embodiment, reference may be made to descriptions in the embodiment corresponding to FIG. 1, and details are not described herein again.

Figure 5:
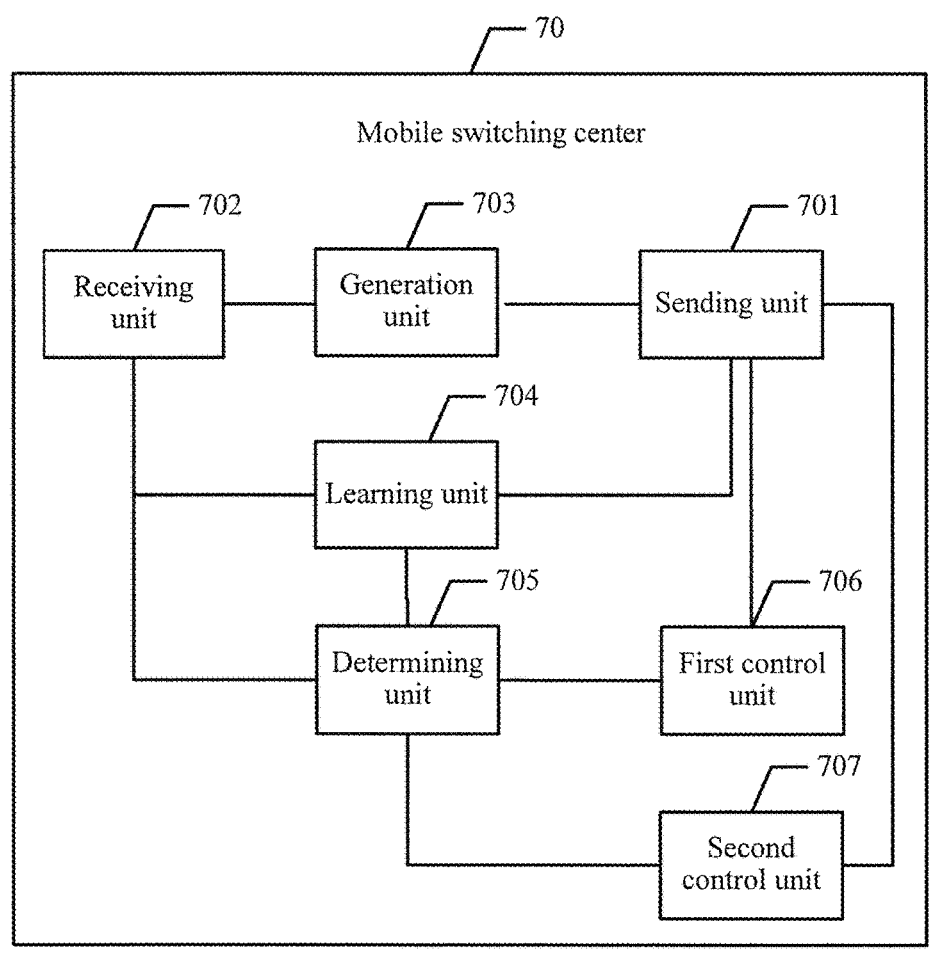
FIG. 5 is a schematic diagram of an embodiment of a mobility management entity according to an embodiment of the present invention.

Referring to FIG. 5, a mobile switching center MSC 70 provided in this embodiment of the present invention includes: a sending unit 701, a receiving unit 702, a generation unit 703, a learning unit 704, and a determining unit 705.

The sending unit 701 is configured to send a paging request to a mobility management entity MME for an incoming call of user equipment UE.

The receiving unit 702 is configured to receive a service request message that is sent by the MME in response to the paging request.

The receiving unit 702 is further configured to receive a handover request message sent by the MME, where the handover request message is used to request the MSC to hand over the UE from the LTE network to a circuit switched CS domain of a second generation 2G or third generation 3G network for circuit switched fallback CSFB.

The generation unit 703 is configured to generate, in the handover process, a session for the incoming call according to the handover request message received by the receiving unit 702.

The receiving unit 702 is further configured to receive a handover complete message from a base station of the 2G or 3G network.

The learning unit 704 is configured to learn, according to the handover complete message received by the receiving unit 702 from the base station of the 2G or 3G network, that the UE generates the session for the incoming call.

The determining unit 705 is configured to: after the learning unit 704 learns that the UE generates the session for the incoming call, determine that the UE accepts the incoming call; and use, for the incoming call, the session generated in the handover process.

After the receiving unit 702 receives the handover complete message sent by the base station, the sending unit 701 does not send a call setup message to the called UE.

The receiving unit 702 is configured to receive the service request message sent by the MME.

The sending unit 701 is configured to send an address complete message or an alerting message after the receiving unit 702 receives the service request message.

The MSC 70 further includes:

a first control unit 706, configured to start a timer after the sending unit 701 sends the circuit switched fallback CSFB paging request; and the determining unit 705 is configured to determine, after the receiving unit 702 receives the service request message sent by the MME and when the timer started by the first control unit 706 expires, that the UE accepts the incoming call.

The MSC 70 further includes:

a second control unit 707, configured to start a timer after the MSC sends the circuit switched fallback CSFB paging request; and the determining unit 705 is configured to determine, after the receiving unit 702 receives the handover request message and when the timer started by the second control unit 707 expires, that the UE accepts the incoming call.

The handover request message carries indication information, where the indication information is used to instruct the MSC to determine that the UE accepts the incoming call.

The determining unit 705 is configured to determine, according to the indication information, that the UE accepts the incoming call.

The receiving unit 702 is further configured to receive an indication message sent by the MME, where the indication message is used to notify the MSC that the UE accepts the incoming call.

The determining unit 705 is configured to determine, according to the indication message received by the receiving unit 702, that the UE accepts the incoming call.

The MSC in this embodiment may execute method steps of the MSC described in the method embodiments of FIG. 1 and FIG. 2, where the receiving unit 702 is configured to receive a message sent to the MSC by another entity, and the sending unit 701 is configured to send a message to the another entity. A person skilled in the art may understand, according to the executed steps in these method embodiments, behaviors of and actions executed by units in an evolved NodeB and a relationship between the units.

Figure 6:
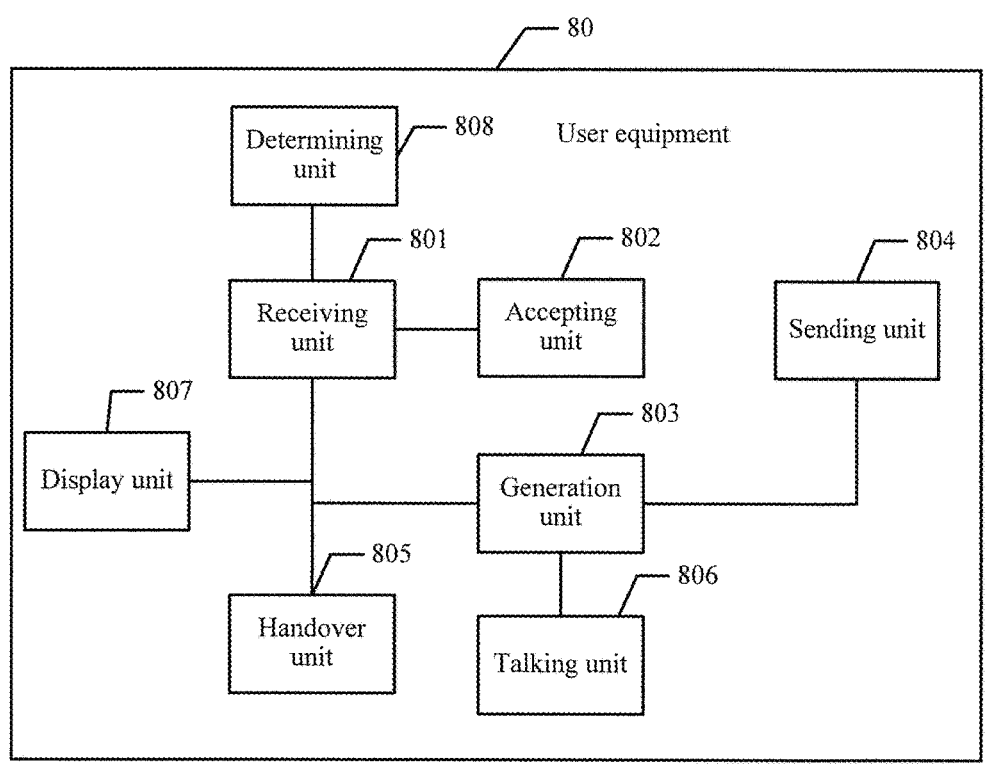
FIG. 6 is a schematic diagram of an embodiment of a mobile switching center according to an embodiment of the present invention.

Referring to FIG. 6, user equipment 80 provided in this embodiment of the present invention includes: a receiving unit 801, an accepting unit 802, a generation unit 803, a sending unit 804, a handover unit 805, and a calling unit 806.

The receiving unit 801 is configured to receive a circuit switched fallback CSFB paging request that is sent by a mobility management entity MME for an incoming call.

The accepting unit 802 is configured to accept, in the LTE network, the incoming call according to the CSFB paging request received by the receiving unit 801.

The generation unit 803 is configured to generate a request message after the receiving unit 801 receives the CSFB paging request, where the request message is used to request CSFB.

The sending unit 804 is configured to send, to the MME, the request message generated by the generation unit 803.

The receiving unit is 801 is further configured to receive a handover command sent by an evolved NodeB, where the handover command is used to instruct to hand over the UE from the LTE network to a circuit switched CS domain of a 2G or 3G network for the CSFB.

The handover unit 805 is configured to hand over the user equipment 80 from the LTE network to the CS domain of the 2G or 3G network according to the handover command received by the receiving unit 801.

The generation unit 803 is further configured to generate, in the handover process of the handover unit 805, a voice session for the UE.

The calling unit 806 is configured to perform talking by using the voice session generated by the generation unit 803.

The UE 80 further includes a display unit 807, where the display unit 807 is configured to display a user number of the calling UE.

The UE 80 further includes a determining unit 808, where the determining unit 808 is configured to determine that the UE supports the handover from the LTE network to the CS domain of the 2G or 3G network.

The UE in this embodiment may execute method steps of the UE described in the method embodiments in FIG. 1 and FIG. 3, where the receiving unit 801 is configured to receive a message sent to the UE by another entity, and the sending unit 804 is configured to send a message to the another entity. A person skilled in the art may understand, according to the executed steps in these method embodiments, behaviors of and actions executed by units in the UE and a relationship between the units.

Figure 7:
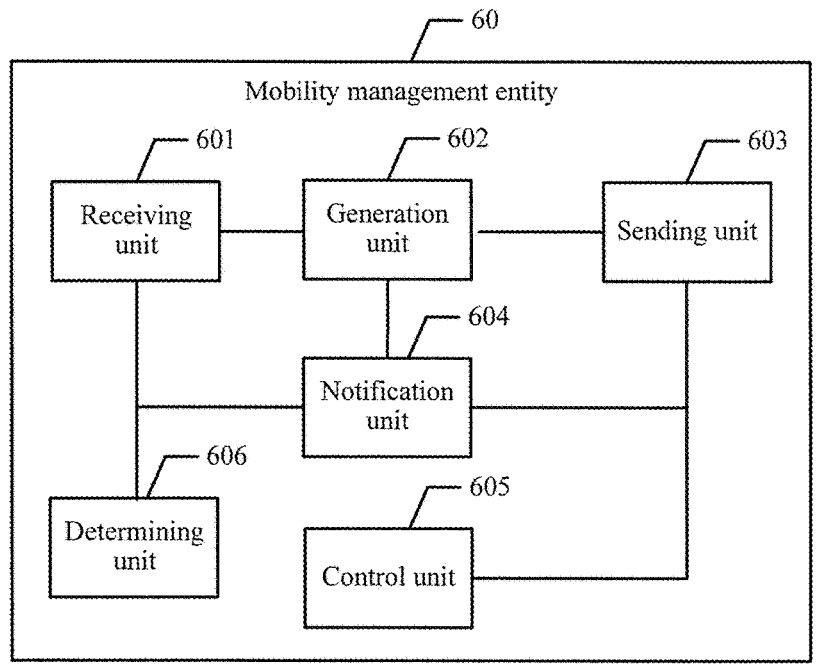
FIG. 7 is a schematic diagram of an embodiment of user equipment according to an embodiment of the present invention.

Referring to FIG. 7, a mobility management entity MME 60 provided in this embodiment of the present invention includes: a receiving unit 601, a generation unit 602, a sending unit 603, and a notification unit 604.

The receiving unit 601 is configured to receive, from a mobile switching center MSC, a paging request for an incoming call.

The generation unit 602 is configured to generate a circuit switched fallback CSFB paging request according to the paging request received by the receiving unit 601.

The sending unit 603 is configured to send the circuit switched fallback CSFB paging request to user equipment UE located in a Long Term Evolution LTE network.

The receiving unit 601 is further configured to receive a request message initiated by the UE, where the request message is used to request CSFB.

The notification unit 604 is configured to: after the receiving unit receives the request message, notify the MSC that the UE accepts the incoming call.

The generation unit 602 is further configured to generate a handover request message after the determining unit 604 determines that the UE accepts the incoming call, where the handover request message is used to request the MSC to hand over the UE from the LTE network to a CS domain of the 2G or 3G network for the CSFB.

The sending unit 603 is further configured to send, to the mobile switching center MSC, the handover request message generated by the generation unit 602.

The mobility management entity 60 may further include a control unit 605, where
the control unit 605 is configured to start a timer after the sending unit 603 sends the circuit switched fallback CSFB paging request; and
the notification unit 604 is configured to: after the receiving unit 601 receives the request message initiated by the called UE and when the timer started by the first control unit expires, determine that the UE accepts the incoming call.

The notification unit 604 is configured to notify, by sending a service request message to the MSC, the MSC that the UE accepts the incoming call.

The mobility management entity further includes a determining unit 606; where
the determining unit 606 is configured to determine that the UE supports the handover from the LTE network to the CS domain of the 2G or 3G network.

The mobility management entity in this embodiment may execute method steps of the MME described in the embodiments in FIG. 1 and FIG. 4, where the receiving unit 601 is configured to receive a message sent to the MME by another entity, and the sending unit 603 is configured to send a message to the another entity. A person skilled in the art may understand, according to the executed steps in these method embodiments, behaviors of and actions executed by units in the MME and a relationship between the units.

Figure 8:
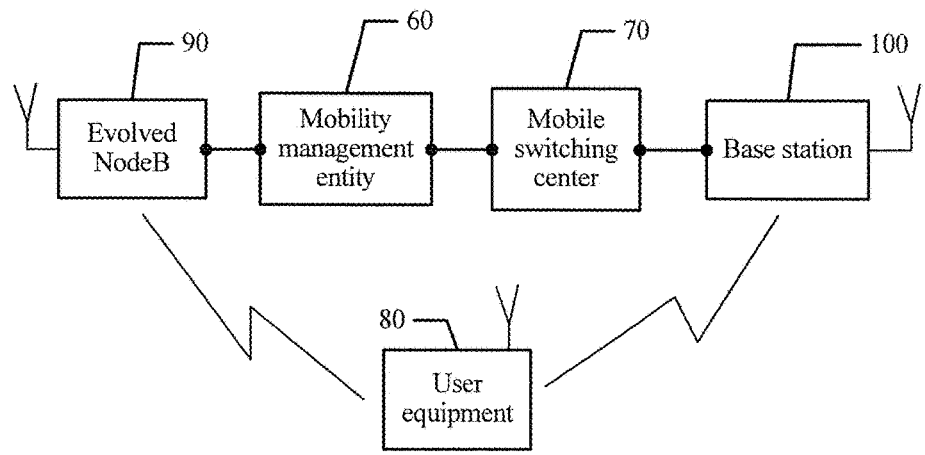
FIG. 8 is a schematic diagram of an embodiment of a network system according to an embodiment of the present invention.

Referring to FIG. 8, an embodiment of a network handover system provided in this embodiment of the present invention includes: a mobility management entity 60, an evolved NodeB 90, a mobile switching center 70, a base station 100, and user equipment 80.

For actions separately performed by and interaction between the mobility management entity 60, the evolved NodeB 90, the mobile switching center 70, the base station 100, and the user equipment 80, reference may be made to descriptions in FIG. 1 and descriptions of method embodiments and apparatus embodiments in FIG. 2 to FIG. 7, and details are not described herein again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The LTE network mentioned in the present invention includes an LTE A network and a network of an LTE version that may subsequently appear.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network handover method, comprising:
   receiving, by a user equipment (UE) located in a Long Term Evolution (LTE) network, a circuit switched fallback (CSFB) paging request that is sent from a mobility management entity (MME) for an incoming call;
   receiving, in the LTE network by the UE, the incoming call;
   sending, by the UE, a request message to the MME, wherein the request message requests CSFB;
   sending, by the UE to an eNodeB, an indication that the UE supports a handover capability of a handover from the LTE network to a circuit switched (CS) domain of a 2G or 3G network;
   receiving, by the UE, a handover command sent from the eNodeB, wherein the handover command instructs to hand over the UE from the LTE network to the CS domain of the 2G or 3G network for the CSFB;
   handing over, by the UE, from the LTE network to the CS domain of the 2G or 3G network according to the handover command;
   generating, by the UE, in the handover, a voice session for the UE according to the handover command; and
   performing, by the UE, talking by using the voice session generated in the handover.

2. The method according to claim 1, wherein:
   the paging request carries a user number of a calling user equipment; and
   the method further comprises:
   displaying, by the UE, the user number.

3. The method according to claim 1, wherein the request message further notifies the MME that the UE accepts the incoming call.

4. The method according to claim 1, further comprising:
   determining, by the UE, that the UE supports the handover from the LTE network to the CS domain of the 2G or 3G network.

5. A network handover method, comprising:
   receiving, by a mobility management entity (MME) from a mobile switching center (MSC), a paging request for an incoming call;
   sending, by the MME according to the paging request, a circuit switched fallback (CSFB) paging request to a user equipment (UE) located in a Long Term Evolution (LTE) network;
   receiving, by the MME, a request message initiated by the UE, wherein the request message requests CSFB;
   notifying, by the MME according to the request message, the MSC that the UE accepts the incoming call; and
   sending, by the MME, a handover request message to the MSC, wherein the handover request message requests the MSC to hand over the UE from the LTE network to a CS domain of a 2G or 3G network for the CSFB.

6. The method according to claim 5, wherein:
   the method further comprises:
   starting, by the MME, a timer after sending the CSFB paging request; and
   notifying, by the MME, the MSC that the UE accepts the incoming call comprises:
   notifying, by the MME according to the received request message and when the timer expires, the MSC that the UE accepts the incoming call.

7. The method according to claim 5, wherein the request message further notifies the MME that the UE accepts the incoming call.

8. The method according to claim 5, wherein notifying, by the MME, the MSC that the UE accepts the incoming call comprises:
   notifying, by the MME by sending a service request message to the MSC, the MSC that the UE accepts the incoming call.

9. The method according to claim 5, wherein the CSFB paging request further notifies the UE of the incoming call.

10. The method according to claim 5, wherein the method further comprises:
    determining, by the MME, that the UE supports the handover from the LTE network to the CS domain of the 2G or 3G network.

11. User equipment (UE), comprising:
    a receiver, configured to receive a circuit switched fallback (CSFB) paging request that is sent from a mobility management entity (MME) for an incoming call;
    a processor, configured to:
    accept, in an LTE network, the incoming call according to the CSFB paging request received by the receiver, and
    generate a request message after the receiver receives the CSFB paging request, wherein the request message requests CSFB;
    a transmitter, configured to:
    send, to the MME, the request message generated by the processor, and send, to an eNodeB, an indication that the UE supports a handover capability of a handover from the LTE network to a circuit switched (CS) domain of a 2G or 3G network;

wherein the receiver is further configured to receive a handover command sent from the eNodeB, wherein the handover command instructs to hand over the UE from the LTE network to the CS domain of the 2G or 3G network for the CSFB; and wherein the processor is further configured to hand over the UE from the LTE network to the CS domain of the 2G or 3G network according to the handover command received by the receiver to generate a voice session for the UE, and to perform talking by using the voice session generated.

12. The UE according to claim 11, wherein:

the paging request carries a user number of a calling UE; and the UE further comprises:

a display unit, configured to display the user number of the calling UE.

13. The UE according to claim 11, wherein the request message further notifies the MME that the UE accepts the incoming call.

14. The UE according to claim 11, wherein the processor is further configured to determine that the UE supports the handover from the LTE network to the CS domain of the 2G or 3G network.

15. A mobility management entity (MME), comprising:

a receiver, configured to receive, from a mobile switching center (MSC), a paging request for an incoming call;

a processor, configured to generate a circuit switched fallback (CSFB) paging request according to the paging request;

a transmitter, configured to send the CSFB paging request to a user equipment (UE) located in a Long Term Evolution (LTE) network;

wherein the receiver is further configured to receive a request message initiated by the UE, wherein the request message requests CSFB;

wherein the processor is further configured to: after the receiver receives the request message, notify the MSC that the UE accepts the incoming call, and to generate a handover request message after notifying the MSC that the UE accepts the incoming call, wherein the handover request message requests the MSC to hand over the UE from the LTE network to a CS domain of a 2G or 3G network for the CSFB; and wherein the transmitter is further configured to send, to the MSC, the handover request message generated.

16. The mobility management entity according to claim 15, wherein the processor is further configured to start a timer after the transmitter sends the CSFB paging request, and to notify, according to the request message and when the timer expires, the MSC that the UE accepts the incoming call.

17. The mobility management entity according to claim 15, wherein the request message further notifies the MME that the UE accepts the incoming call.

18. The mobility management entity according to claim 15, wherein the CSFB paging request further notifies the UE of the incoming call.

19. The mobility management entity according to claim 15, wherein the processor is further configured to determine that the UE supports the handover from the LTE network to the CS domain of the 2G or 3G network.

* * * * *